US008644959B2

(12) United States Patent
Hermann (10) Patent No.: US 8,644,959 B2
(45) Date of Patent: Feb. 4, 2014

(54) SYSTEM AND METHOD FOR FUNCTIONALIZATION IN LINE WITH DEMAND, FOR CONTROL AND REGULATORY DEVICES

(75) Inventor: Wolfgang Hermann, Heidelberg (DE)

(73) Assignee: ABB AG, Mannheim (DE)

(*) Notice: Subject to any disclaimer, the term of this patent is extended or adjusted under 35 U.S.C. 154(b) by 797 days.

(21) Appl. No.: 12/441,438

(22) PCT Filed: Aug. 21, 2007

(86) PCT No.: PCT/EP2007/007342
§ 371 (c)(1),
(2), (4) Date: Nov. 9, 2009

(87) PCT Pub. No.: WO2008/031489
PCT Pub. Date: Mar. 20, 2008

(65) Prior Publication Data
US 2010/0100198 A1 Apr. 22, 2010

(30) Foreign Application Priority Data
Sep. 15, 2006 (DE) .......................... 10 2006 044 182

(51) Int. Cl.
*G05B 11/01* (2006.01)
(52) U.S. Cl.
USPC .......................................................... 700/11
(58) Field of Classification Search
USPC .......................................................... 700/11
See application file for complete search history.

(56) References Cited

U.S. PATENT DOCUMENTS

| 5,838,974 | A | 11/1998 | Ritscher et al. |
| 5,909,368 | A | 6/1999 | Nixon et al. |
| 6,032,203 | A * | 2/2000 | Heidhues ........................ 710/11 |
| 6,442,754 | B1 * | 8/2002 | Curtis .......................... 717/175 |
| 2003/0217358 | A1 * | 11/2003 | Thurston et al. ............... 717/174 |
| 2006/0015844 | A1 * | 1/2006 | Johnson et al. ............... 717/106 |

FOREIGN PATENT DOCUMENTS

| DE | 10234304 | 2/2004 |
| EP | 0707248 | 4/1996 |
| EP | 0852031 | 7/1998 |

OTHER PUBLICATIONS

"Multilin, 301 Motor Manager Relay", 1993, Multilin.*
Xun W. Xu et al. "STEP-NC and Function Blocks for Interoperable Manufacturing", IEEE Transactions on Automation Science and Engineering, vol. 3, No. 3, Jul. 2006, pp. 297-308.
International Search Report for International No. PCT/EP2007/007342 mailed on Nov. 30, 2007.

* cited by examiner

*Primary Examiner* — Carlos Ortiz Rodriguez
(74) *Attorney, Agent, or Firm* — Leydig, Voit & Mayer, Ltd.

(57) ABSTRACT

A system for demand-based functionalization of a motor control unit comprises a motor control unit, a first data store having a plurality of functional modules each configured to perform one or more functions of the motor control unit and an access device configured to access the first data store and to select at least one of the plurality of functional modules and to load at least one of the plurality of functional modules into the motor control unit. The selection is based on a demand and the selective loading results in a flexibly customizable functionality of the motor control unit.

18 Claims, 4 Drawing Sheets

SYSTEM AND METHOD FOR FUNCTIONALIZATION IN LINE WITH DEMAND, FOR CONTROL AND REGULATORY DEVICES

This application is a U.S. National Phase application under 35 U.S.C. §371 of International Application No. PCT/EP2007/007342, filed on Aug. 21, 2007, which claims priority to German Patent Application No. DE 10 2006 044 182.6, filed on Sep. 15, 2006. The International Application was published in German on Mar. 20, 2008 as WO2008/031489.

The invention relates to a system and a method for the demand-based functionalization of control and/or regulatory devices, particularly of motor control units.

BACKGROUND

Conventionally, control/regulatory devices, such as motor controllers, with a stipulated, predetermined scope of functions are used, the scope of functions essentially being stipulated by the implemented firmware, that is to say the program component which is impressed once on the read-only memory of the appliance and determines the mode of operation and/or manner of operation thereof. To cover a said spectrum of different functionalities, usually entire families of appliances are therefore manufactured, the individual family members of which have respective differently designed firmware and hence also different scopes of functions.

It should be pointed out that in the text below the terms motor control unit and motor controller are used synonymously.

Thus, by way of example, low voltage motor control centers (LV-MCC), with appropriate motor control units, the primary task of which is to control and protect motors in industrial processes, enjoy widespread distribution or use in industrial applications, the many and diverse opportunities for use meaning that the highest possible level of compatibility and flexibility and simultaneously simple manageability is demanded and desirable.

In conventional appliances, the user usually merely has the option of altering and/customizing the scope of functions of the respective control/regulatory device through one-off manual selection of individual functions by means of configuration during the installation—within limits stipulated by the respective firmware. A drawback, however, is that the device then retains the rigid, predetermined scope of functions which is stipulated by the firmware. Flexible customization in line with demand, tailored individually to the respective requirements and/or areas of use, or even possible updates and/or extensions of the functionality of the relevant control/regulatory device, particularly of the motor controller, is/are no longer possible in this way, however.

SUMMARY OF THE INVENTION

An aspect of present the invention therefore allows flexible and demand-based functionalization of control and regulatory devices, particularly of motor control units.

This aspect is achieved by a system for the functionalization of control and/or regulatory devices, particularly of motor control units, having the features of claim 1. Advantageous developments and refinements of the system according to the invention and an appropriate method are specified in further claims and in the description below.

The inventive system for the functionalization of control/regulatory devices, particularly of a motor control unit, in line with demand, comprises at least one access means for accessing at least one first data store, and also at least one control/regulatory device, wherein the at least one first data store has at least one functional module which can perform one or more functions of the respective control/regulatory device, and wherein the cooperation of access means and the at least one first data store can be used to selectively transfer at least one functional module to at least one control/regulatory device and/or to store it for execution, and the overall functionality of the respective control/regulatory device is variably or flexibly customizable through demand-based selection of one or more functional modules.

In this case, in one advantageous development, the access means may be in the form of a data processing device, particularly in the form of a microprocessor or microcontroller, and may advantageously comprise an input and display device in order to select the various functional modules or functions.

Advantageously, the access means, which, in particular, is in the form of a microprocessor or microcontroller, may accordingly also be integrated in the control/regulatory device.

In one development of the system, the control/regulatory device comprises a data store which is particularly in the form of a permanent (nonvolatile) read-only memory or solid-state memory and/or can be integrated into the control/regulatory device. In this case, the memory may particularly be in the form of a flash memory, for example in the form of NAND flash or NCR flash.

Advantageously, the data store of the control/regulatory device may also be implemented in the integrated access means, in the form of a microprocessor or microcontroller, of the control/regulatory device, for example as an "embedded flash". Advantageously, appropriate hardware and/or software interfaces can be provided for the purpose of data interchange and for the purpose of communication between first data store and access means and also control/regulatory device, such as PCI bus, SCSI, USB, Firewire, RS-232. Advantageously, the data interchange can also be effected using appropriate pilot and/or fieldbus systems, such as RS-485, CAN, CANopen, DeviceNet, EIB, Fieldbus Foundation, Interbus, LCN (Local Control Network), Modbus, Profibus, SERCOS Interface, TTP and also Ethernet or Realtime Ethernet, such as EtherCAT, Ethernet Powerlink, Profinet, Ethernet/IP or else Industrial Ethernet and possibly combinations thereof, appropriate interfaces being able to be provided.

In a further refinement of the system, the access means uses selected functional modules to create a function archive in which the selected functional modules are provided for transfer. In this case, the modules may be stored in packed and/or compressed form in the function archive, particularly in order to save storage space and/or to reduce transfer times or to speed up later data transfer.

In addition, the function archive can be stored retrievably on the first data store, the archive advantageously being structured in successive blocks. Every block apart from the first and the last archive block then corresponds essentially to a functional module. If a plurality of functional modules, or the functions implemented by them, are closely linked or coupled to one another or if there are dependencies, for example as may occur when functionalities of the control/regulatory device are implemented, then one or more archive blocks having a plurality of functional modules may also advantageously be provided.

In this context, the various functional modules may advantageously have provision, by way of example, for the measurement and/or detection of currents and/or voltages, the creation of a thermal map of a piece of equipment, particularly of a motor, the detection of current spikes and/or voltage spikes, the detection and/or monitoring of at least one speed and/or of idling, and also the reading and/or monitoring of a wide variety of sensors, for example relating to filling levels, humidities and/or temperatures.

The order of the blocks or of the functional modules within the archive, with the exception of the first and last blocks, can be arranged as desired in this case.

Every archive block has a header and the actual content of the respective functional module. The header contains all the information relevant to the unpacking of the archive, such as name, type, total length, size, version, data rate, origin, addressee, and also the CRC fields for header and data which are used for data protection.

CRC is an abbreviation for cyclic redundancy check, which is a method or a class of methods from information technology for determining a check value for data, e.g. in the case of data transfer in computer networks or in the case of a file, or when unpacking files, in order to be able to detect errors during transfer or duplication and/or errors during the compression/decompression of data.

Accordingly, prior to the start of the transfer of a data block and subsequently thereto, a respective CRC value is calculated and the two check values are compared with one another. The CRC method is designed such that errors during the transfer of the data, such as may be caused by noise on the line, damping or other transmission errors, are for the most part spotted. If it is furthermore also necessary to ensure the integrity of the data, it is advantageously also possible to use further methods of protection, for example using cryptographic hash functions.

In one advantageous form of the system, the first archive block marks the start of the archive and/or comprises an identifier for identification and/or association of the respective archive. The last block is used merely to identify the end of the archive.

In one development of the system, the control/regulatory device comprises a basic component, preferably stored in the second data store, which allows the transfer and/or loading and/or storage and/or execution and/or management and/or unpacking of at least one functional module and/or function archive in the control/regulatory device.

Advantageously, a configuration tool can be provided which may be integrated in the access means and uses appropriate interfaces to transfer and load the firmware which is required for the operation of the control/regulatory device and which determines the functionality thereof as an archive of functional modules onto said control/regulatory device, wherein the respective control/regulatory device unpacks and installs the individual functional modules during the respective transfer/loading operation, particularly using its basic component, and hence implements the relevant functions in the motor controller.

In addition, the configuration tool advantageously allows the relevant configuration parameters to be stipulated and/or loaded into the control/regulatory device. Every functional module contained in the archive then corresponds to at least one predetermined function of the motor controller or motor control unit.

On the basis of demand, when configuring the control/regulatory device, the respective required functions and/or functionalities, including the associated functional modules, can be selected from a database of the data store, for example, using the access means, and can be stored retrievably in archived form in the database.

In one advantageous development of the system, at least one descriptor can be provided which creates an appropriate functional and/or technical description of the firmware, particularly of the properties of the individual blocks of the function archive, in parallel with the creation of the firmware and/or of the function archive. This description is stored retrievably, preferably in the form of a file, particularly in XML format, in a data store, particularly in a database.

The firmware and hence the overall functionality of the control/regulatory device is obtained in this case as the sum of the selected individual functions and/or functionalities and also of the modules.

In one advantageous refinement of the system, an identifier can be provided which allocates a Universally Unique Identifier (UUID) during the creation of the firmware archive and/or of the descriptions, so that archive and description are identified and can be explicitly associated with one another. In this case, the UUID is preferably carried in the first block of the function archive.

In one particular refinement, at least one component of the system is implemented using slide-in technology and is provided for installation in a switchgear cabinet and/or switchgear and/or switchpanel, that is to say access means, control/regulatory device, particularly the motor control unit, and also the first data store can be implemented using slide-in technology for installation in a switchgear cabinet. The switchgear cabinet can in turn be provided as part of a switchpanel.

It is also advantageously possible to provide for the firmware created or the function archive created to be configured once and loaded onto a plurality of control/regulatory devices in parallel via an appropriate network, particularly a distributed network, or an appropriate connection. Preferably, these are control/regulatory devices of the same or comparable type or kind with accordingly comparable tasks.

In addition, the stated aspect is also achieved by an appropriate method which is provided particularly for execution on a system of exemplary design in line with the invention.

The inventive method for functionalizing control/regulatory devices in line with demand has a provision that, in steps,
 a function selection made in preparatory fashion on the basis of demand is used to select one or more functional modules stored on a first data store, particularly a database,
 the selected functional modules are taken as a basis for creating at least one function archive, and
 the created archive is loaded into at least one control/regulatory device, particularly into a data store of the respective control/regulatory device, as a result of which the associated functional modules and underlying functions are implemented in the respective control/regulatory device and flexible customization of the overall functionality of the respective control/regulatory device is performed through demand-based selection of the respective functional modules.

The preparatory performance of the function selection and/or selection of the functional modules can in this case be effected, in one advantageous development of the method, using an access means which, in particular, is in the form of a microprocessor and/or data processing device, preferably with an input and display device.

In a further development of the method, the selected functional modules are provided in the function archive in packed and/or compressed form for the purpose of transfer and/or the function archive is stored retrievably on the first data store.

In order to ensure the modularity and/or customizability of the archive, it is advantageously created in successive blocks, the order of the blocks and hence of the functional modules within the archive being irrelevant. Only the first and last blocks have their nature and content stipulated with sufficient accuracy.

In one advantageous development, the function archive created is loaded into a data store of the control/regulatory device, particularly into a data store which is in the form of a nonvolatile read-only memory. In this case, the loading operation comprises the transfer and the unpacking of the archive and also the installation of the functional modules and corresponding implementation of the relevant functions.

In one development of the method, the function archive and accordingly the firmware are loaded into the control/regulatory device, and configured, using a configuration tool, which can advantageously be integrated into the access means.

Accordingly, the firmware which is required for the operation of the control/regulatory device and which determines the functionality thereof is loaded as an archive of functional modules onto the motor controller or motor control unit, for example.

Advantageously, a basic component of the control/regulatory device is provided which allows the loading/unpacking and/or installation of the relevant functional modules and implementation of the previously selected functions in the respective motor control unit.

Every functional module contained in the archive implements at least one selected function of the motor controller in this case.

On the basis of demand, during the configuration of the control/regulatory device, the respectively required functions and/or functionalities are selected in preparation for the method from a database of the data store, for example, using an appropriate interface and, on the basis of this, the access means is used to automatically select the associated functional modules and to store them retrievably in archived form in the database.

In this case, the term interface is understood to mean any means for data or information interchange, with both software and hardware interfaces being covered. For example, these include input means, particularly a keyboard, touch screen and appropriate program and program code means, and also output means, particularly a monitor, printer, fax, e-mail and appropriate programs and program code means.

The archived functional modules are therefore used to create an individual, demand-based piece of firmware specifically for the control/regulatory device, particularly the respective motor controller.

In one advantageous development of the method, an appropriate functional and/or technical description of the firmware, particularly for the respective configuration and control systems, is created in parallel with the firmware.

The firmware and hence the overall functionality of the control/regulatory device are in this case produced as the sum of the selected individual functions and/or functionalities.

In one advantageous refinement of the method, an identifier is provided which, during the creation of the firmware archive and/or the description, is preferably allocated as a Universally Unique Identifier (UUID), so that archive and description are identified and explicitly associated with one another.

The rest of the description of the invention and also advantageous developments and refinements is provided with reference to some figures and exemplary embodiments, which are indicated below.

DETAILED DESCRIPTION

Figure 1:
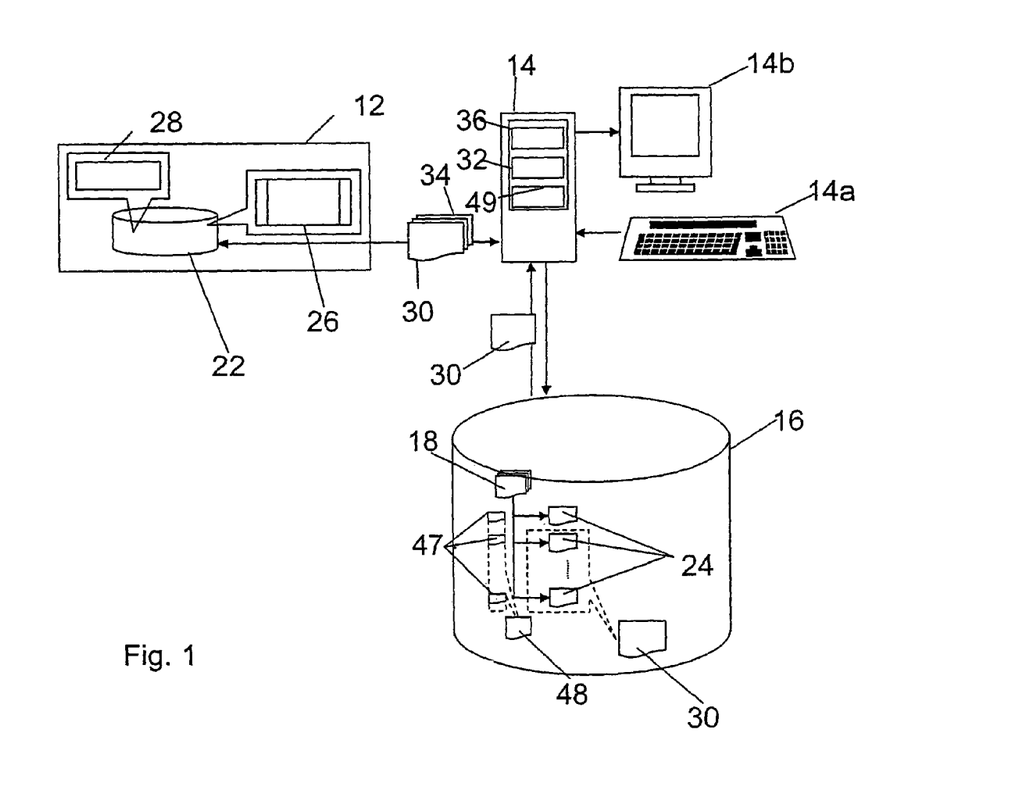
FIG. 1 shows a system of exemplary design for the demand-based functionalization of control/regulatory devices.

FIG. 1 shows an exemplary form of a system for the demand-based functionalization of control/regulatory devices, in this case a motor control unit 12, which comprises an access means 14, in the form of a data processing device, including display 14a and output device 14b, for accessing a data store 16 with a database 18, and also a control/regulatory device 12, in the form of a motor control unit, with a read-only memory 22. The database 18 has a collection of a plurality of functional modules 24, each of which respectively contains a predetermined function of the control/regulatory device 12 and implements this function following installation in the control/regulatory device 12. Advantageously, a functional module 24 may also contain and/or implement a plurality of functions and/or a functionality.

In this case, the functionality can be distinguished from an individual function, for example the "temperature recording" functionality may comprise a plurality of functions such as, particularly, reading the measured values from a temperature sensor, identifying the sensor data with local and/or temporal resolution, storing the sensor data in a database and outputting the sensor data on a printer and/or monitor.

It is also advantageously possible to provide for implementation of functions and/or functionalities such as, in particular, one or more current measurement operations, the creation of a thermal map, for example of a motor, the reading/or monitoring of one or more contact temperature sensors, the detection of overcurrents and/or current spikes, and the same for voltages, the detection and/or monitoring of at least one speed and/or idling.

The read-only memory 22 of the control/regulatory device 12 in the form of a motor control unit advantageously comprises an executable basic component 26 which, in cooperation with data processing device 14 and data store 16, allows selective transfer, storage and installation of one or more functional modules 24 in the read-only memory 22 of the motor control unit 12.

The firmware 28 which is required for the operation of the respective device and which determines the functionality thereof is accordingly of modular design and is stored as an archive 30 of the functional modules 24 in or on the data store 16 using the data processing device 14, following selection of the functions and/or functional modules 24 which are to be implemented.

The access means in the form of a data processing device 14 uses a configuration tool 32, in cooperation with the basic component 26, to load the function archive 30 into the read-only memory 22 of the motor control unit 12.

When the archive 30 has been transferred, the motor control unit 12, particularly the basic component 26 thereof, unpacks and/or installs the functional modules it contains in the read-only memory 22 of the motor control unit 12 and therefore implements the underlying functions and functionalities.

In this case, every functional module 24 contained in the archive corresponds to at least one predetermined function and/or functionality of the motor control unit 12.

The firmware and hence the overall functionality of the motor control unit 12 is in this case in the form of the sum of the individual functions and/or functionalities of the selected functional modules 24.

Advantageously, the data processing device 14 comprises a configuration tool 32 which uses appropriate interfaces to load the firmware 28 which is required for the operation of the motor control unit 12 and which determines the functionality thereof as an archive 30 of functional modules onto said motor control unit and advantageously allows appropriate configuration parameters 34 to be stipulated and/or loaded into the motor control unit 12. In this case, the configuration tool 32 is advantageously in the form of a program component and integrated in the access means 14 which is in the form of a data processing device.

On the basis of the system, there is in this case the possibility of both reconfiguration of the firmware 28 of a motor control unit 12 and also customization and/or extension of an already existing piece of firmware 28 by virtue of individual functions and also functional modules 24 being able to be selected and/or implemented individually and on the basis of demand.

In addition, at least one checking means 36 can be provided which checks the selected functional modules 24 and/or their functions for dependencies and/or links and uses any dependencies and/or links ascertained to perform a plausibility check for the completeness of the selected functional modules 24.

If it is established during the check that actually required functional modules 24 have not been selected despite there being dependencies and/or links, the checking means 36 generates an appropriate signal, for example a visual and/or audible signal, particularly an appropriate warning message, and/or indicates which functional modules 24 are yet to be selected.

It is also possible to provide for the checking means 36 to automatically select and hence add to functional modules 24 which are still missing but are required on account of existing dependencies and/or links.

It is also possible for each entry in the database 18 of the data store 16 or each functional module 24 to be provided with and to have an associated description file 47, which is preferably stored in XML format. The stored module descriptions 47 can then be used to create a description 48 of the function archive 30 and of the relevant firmware 28 using a descriptor 49 which can be provided and/or to store it on the data store 16, and said descriptor can be transmitted to one or more control/regulatory devices, in particular together with the firmware 28.

Figure 2:
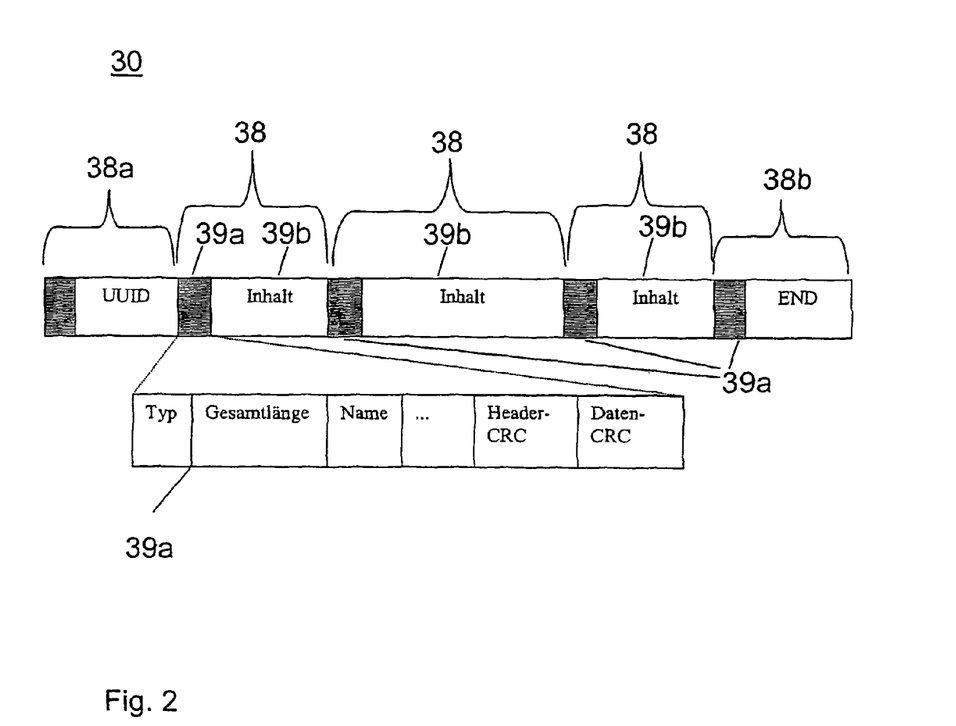
FIG. 2 shows a function archive of exemplary design with a block structure.

In order to ensure the modularity and/or customizability of the archive, said archive is, as shown in FIG. 2, advantageously created in successive blocks 38, the order of the blocks 38 and hence of the functional modules 24 within the archive 30 being irrelevant. Only the first 38a and the last block 38b have their nature and content stipulated sufficiently accurately.

In this case, every archive block 38 has a header 39a and also the actual content 39b of the respective functional module 24. The header 39a contains all the information which is relevant to unpacking the archive 30, such as type, total length, size, version, data rate, origin, addressee, and also the CRC fields for header 39a and data 39b which are used for data protection.

Figure 3:
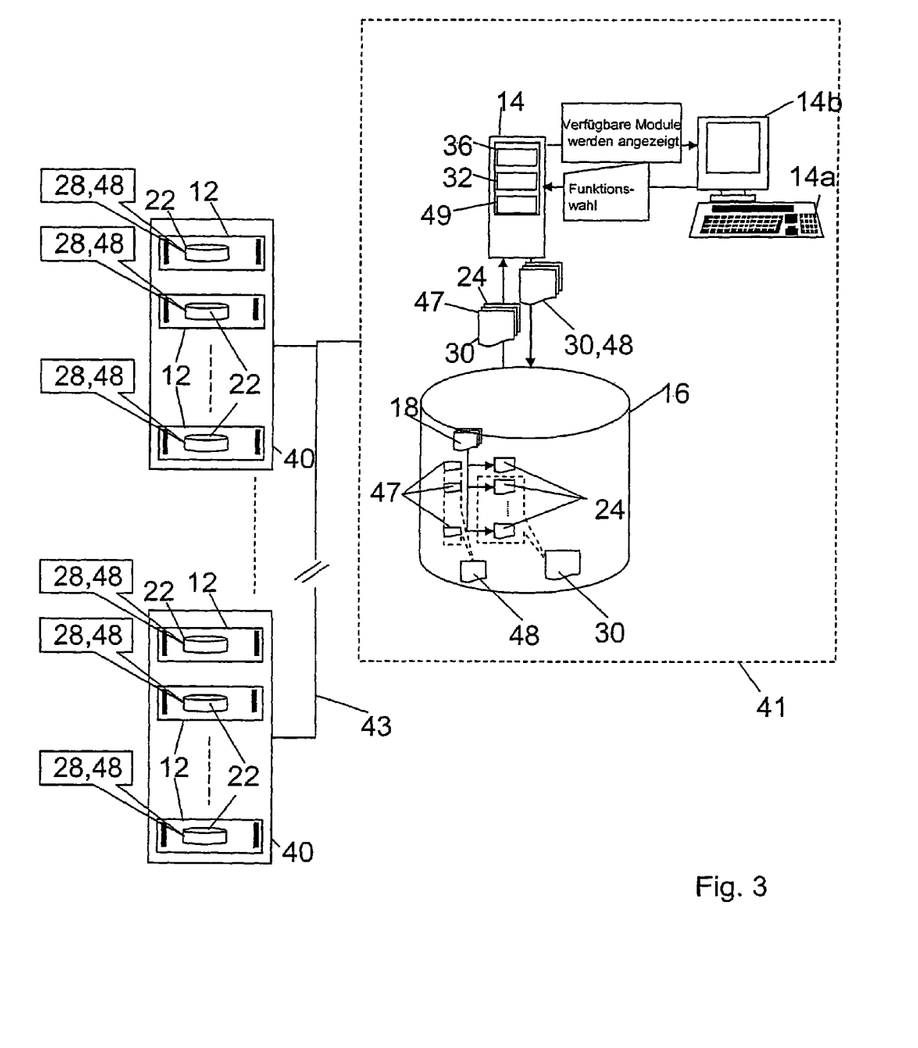
FIG. 3 shows an engineering system of exemplary design in line with the invention.

Advantageously, the aforementioned system can, as shown in FIG. 3, be integrated into an engineering system 41 for switchgear 40, so that apart from the configuration of the respective switchgear 40 it is also possible for the relevant motor controller firmware to be created on the basis of the system. In this case, in particular, it is also possible for a plurality of different firmware components or variants to be created and/or assigned to one or more motor control units 12. The respective firmware 28 is assigned and/or loaded using appropriate interfaces and a local area network (LAN) 43 or world area network (WAN) or an appropriate bus and/or pilot system.

In particular, the engineering system can be made variable in respect of the control commands, file structure and/or layout.

A display/input device 14a, b is used to access data and/or regulatory components, and also to display them. Furthermore, it is also used to effect the, generally manual, selection of the desired functions of the at least one control/regulatory device 12, particularly of the motor control unit.

After selection of the functions, the access means 14 are used to select the relevant functional modules 24 from the database 18 of the data store 16 in the engineering system 41, to create a function archive 30 therefrom and to store said function archive in or on the data store 16.

For every entry in the database 18 of the engineering system, it is also possible to provide a description file 47 which describes the properties of the respective archive block 38. For this description file 47, the XML format is preferably used (generally known data description format similar to HTML).

Accordingly, a description 48 of the function archive 30 and of the relevant firmware 28 is created in parallel by means of a descriptor 49 using the module descriptions 47 stored on the data store 16. The configuration tool 32 of the access means 14 and the display/input device 14a, b—also called HMI "human machine interface"—are used to configure the function archive 30 or the relevant firmware 28 and to load the resulting configuration parameters together with the archive 30 and/or the created archive description 48 onto one or more motor control units 12 of one or more pieces of switchgear 40 via an appropriate data line 43.

In one advantageous development, the created archive file 48 can also be stored as a file on a data store, particularly the data store 16 of the engineering system 41, and is therefore also made available to other systems, servers and/or control/regulatory devices via an appropriate network connection.

The runtime environment of the respective motor controller or motor control unit 12 is limited to the respective operating system, the realtime scheduler and the communication stack, for example TCP/IP network driver or RTNET (realtime network driver). The entire remainder, including the installation and/or starting procedures, is part of the firmware 28 to be downloaded or the function archive 30. The respective system can therefore be customized very flexibly to changing/new requirements.

Figure 4:
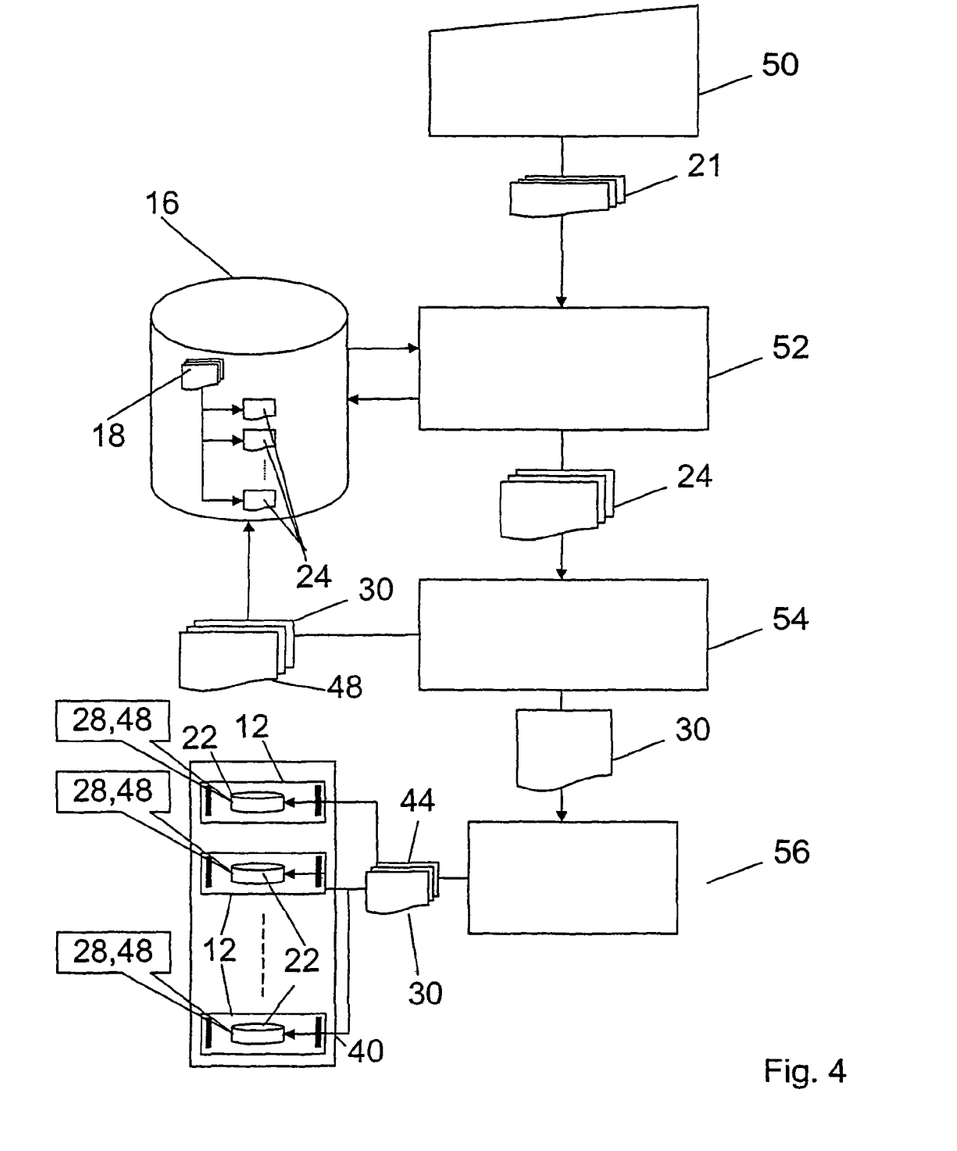
FIG. 4 shows an exemplary form of the flow of the method for the demand-based functionalization of control/regulatory devices.

FIG. 4 shows an exemplary form of a sequence of the inventive method for functionalizing control/regulatory devices which can advantageously be executed on one of the systems described above.

In this case, to functionalize a motor control unit 12 in line with demand, demand-based function selection performed in preparation for the method is used to load one or more functional modules stored on a data store 16 in a database 18 selectively into the motor control unit 12. To this end, preparatory demand-based function selection from a plurality of provided functions is performed in a first step 50.

In a second step 52, the selected functions 21 are used to automatically select one or more functional modules 24 which are stored on a first data store 16 in a database 18 and which are associated with the respective functions. On the basis of the selected functional modules 24, at least one function archive 30 is created in a third step 54 and, in a fourth step 56, the created archive 30 is loaded into the respective motor control unit 12, particularly the data store 22 of the respective motor control unit 12. This operation involves the associated functional modules 24 and underlying functions being implemented in the respective motor control unit 12.

Advantageously, the created archive 30 can be transferred in the loading operation not only to one control/regulatory device 12 but also almost simultaneously to a plurality of such devices 12, which can be accessed via appropriate interfaces and/or an appropriate network and/or bus system, for example, and which are arranged in a piece of switchgear 40 and/or a distributed system, in particular, and/or the relevant functional modules 24 and functions can then be installed and implemented.

This results in fixable customization of the overall functionality of the motor control unit 12 through demand-based selection of the respective functional modules 24.

The preparatory performance of the function selection and/or selection of the functional modules 24 can in this case be performed, in one advantageous development of the method, using an access means 14, particularly in the form of a microprocessor and/or data processing device, preferably with an input and display device, the actual selection being made manually using an appropriate HMI (Human Machine Interface), particularly an input/display device, such as a touchscreen.

The function selection can be made automatically or semi-automatically or manually by appropriate input, depending on stipulations.

In the variant which is automated on the basis of stipulations, the desired scope of functions is defined in advance, for example within the context of a stored data record with appropriate instructions which then merely needs to be processed. By way of example, this variant could be used when updating already implemented functional modules 24 or firmware 28, since in that case the scope of functions is already determined.

In the semi-automatic variant, which could be used for upgrading the firmware 28 and/or functional modules 24, for example, a basic functionality or a firmware basic version which needs to be implemented is already prescribed, particularly by means of an appropriate data record which is to be processed. This appears appropriate particularly when certain types of control/regulatory devices 12, such as motor control units, always necessitate a certain basic functionality. The basic functionality can then be extended and/or also changed and/or customized as desired by means of complementary manual selection of functions using appropriate interfaces and/or input means, for example by replacing or changing functions and/or functional modules 24.

When functions are selected purely manually, the respective user of the method and/or user of the system performing the method manually determines the respective scope of functions or the functionality of the respective control/regulatory device 12, particularly of the motor control unit.

In continuation of the method, the functional modules 24 affiliated or associated with the selected functions are then selected automatically from the database 18 of the data store 16 in the second step 52.

The selected functional modules 24 in the function archive 30 are provided in packed and/or compressed form for transfer and/or the function archive 30 is stored retrievably on the data store 16 in the third step 54.

Alternatively, the archive can also be stored retrievably on another available data store.

In addition, in the fourth step 56, the created function archive 30 is loaded into a data store 22 of the respective motor control unit 12, particularly a data store with the form of a nonvolatile read-only memory. In this case, the loading operation comprises the transfer and unpacking of the archive 30 and also the installation of the functional modules 24 and corresponding implementation of the relevant functions.

In line with the method, in the fourth step 52, the function archive 30 and accordingly the firmware 28 can also be configured and/or the configuration parameters 44 can be loaded with the archive 30 into the respective control/regulatory device, particularly the motor control unit 12.

Every functional module 24 contained in the archive implements at least one selected function of the motor controller 12.

In addition, in parallel with the firmware 28 or the function archive 30, available module descriptions 47 and/or block descriptions for individual archive blocks are also used to generate, in the third step 54, a description 48 of the firmware 28 and/or of the function archive 30, particularly for the respective configuration system and/or a variable and/or command description for the user interface and/or the process control system, particularly the OPC servers) used.

The firmware 28 and hence the overall functionality of the control/regulatory device 12 is in this case in the form of the sum of the selected individual functions and/or functionalities, the firmware 28 being able to be flexibly customized through demand-based selection of one or more functional modules 24.

If the functional modules deposited or stored retrievably in the database 18 are modified, or changed or extended, the control/regulatory device 12 can also adopt other and/or further tasks as part of its hardware options, such as "Condition-Monitoring" and/or gateway for appliances from third-party manufacturers.

In line with the method, what is known as a "Universally Unique Identifier" (UUID) is allocated when creating the firmware archive 30 and/or the descriptions 48, so that archive 30 and description 48 can be explicitly associated with one another.

In this context, the UUID is a customary standard for identifiers which has been standardized by the Open Software Foundation (OSF) as part of the Distributed Computing Environment (DCE).

Advantageously, the selected functional modules 24 are archived taking account of existing dependencies and/or links between the respective functional modules 24.

Advantageously, it is also possible to provide for unselected modules—whose selection would be required on the basis of existing dependencies, however—to be selected and/or complemented automatically.

Furthermore, in the abovementioned case, an appropriate warning message and/or advice message is generated.

If modules interfere with one another and/or if modules 24 mutually or reciprocally exclude one another, an appropriate warning message can likewise be output. In this case, the output can be provided visually and/or audibly.

In line with the invention, the firmware 28 of a control/regulatory device 12 is therefore not prescribed as a monolithic block, but rather can be generated and/or customized individually and on the basis of demand for the individual case through the merging of individual modules 24. In this case, for every function which is intended to be mapped in a module 24, an appropriate description 28 and also an appropriate functional or program code is developed.

This collection of modules can be extended and/or customized in terms of number but also in terms of function and/or can be entered into a database in the respective engineering system, for example.

So long as the implemented interfaces for the modules are downward-compatible, it is recurrently possible to create further modules and/or to customize and/or change the firmware 28 as desired by being able to extend or revise existing modules without there being any resultant disturbing interactions with the other functional modules or said functional modules being affected thereby.

Particularly upon every configuration operation, there is therefore the option of adding to and/or replacing further modules in addition to the already implemented functions and/or functional modules 24 and of implementing the relevant functions or updating already implemented modules and hence keeping the firmware 28 up to date in simple fashion in accordance with the respective needs and/or technical prerequisites, particularly as far as the hardware development and field of use of the respected control/regulatory device 12 are concerned.

In one development of the method, when implemented on an appropriately designed engineering system, the basic functionality of the control/regulatory device 12, particularly of a motor controller is determined and/or stipulated by means of the basic component 26 of the control/regulatory device 12. In addition, an appropriate configuration program is used to indicate all the available functions/functional modules for selection, in which case the functions for the relevant motor starter can be selected, for example, and the demand-based functions and/or functionalities can be selected.

Using the functions and/or functionalities selected on the basis of demand, the program code segments of the associated functional modules 24 are then selected, are combined and/or packed to form a firmware archive 30 and are provided for transfer.

In one development of the invention, the runtime environment of the motor controller 12 is limited to the respective operating system, the realtime scheduler and the communication stack, for example TCP/IP network operator or RTNET (realtime network driver). The entire remainder, including the installation and/or starting procedures, is part of the firmware 28 to be downloaded or of the function archive 30. The system provided for execution can therefore be customized very flexibly to changing/new requirements.

To implement the functional modules 24 transferred to the motor controller 12, first of all an installation script and then a firmware startup script are loaded.

Accordingly, initially present realtime functional modules are suspended in the scheduler and then all the functional modules 24 are loaded and initialized. In this step, each functional module 24 checks whether there are any referenced functional modules/realtime functional modules and whether the respective configuration data are correct.

If the course of the initialization is successful, the functional modules 24 are executed cyclically. The realtime functional modules run in the background with increased priority, for example in order to allow communication operations, time controls in real time.

What is claimed is:

1. A system for demand-based functionalization of a motor control unit comprising:
a motor control unit configured to control operation of a motor;
a first data store having a plurality of functional modules, wherein the functional modules correspond to different functions available for use by the motor control unit during the operation of the motor; an output device configured to display the functions of the functional modules such that at least one of the plurality of functional modules is selectable by a user based on a demand; and
an access device configured to access the first data store and to select, based on the demand, the at least one of the plurality of functional modules and to create a function archive using the at least one selected functional module, the at least one selected functional module being stored in at least one of packed and compressed form in the function archive, the function archive including a plurality of blocks arranged consecutively, wherein each block except a first and a last block includes data of a respective one of the at least one selected functional module and has a header, each of the headers including information relevant to unpacking the function archive and cyclic redundancy check fields for the respective header and the data of the respective one of the at least one selected functional module, the access device being further configured to transfer and load the function archive into the motor control unit so as to provide a flexibly customizable overall functionality of the motor control unit, wherein the access device includes a configuration tool for configuring a firmware required for operation of the motor control unit and determining the overall functionality of the motor control unit, and the configuration tool is configured to at least one of transfer and load the firmware onto the motor control unit.

2. The system as recited in claim 1, wherein the motor control unit has a second data store.

3. The system as recited in claim 2, wherein the second data store is in the form of a permanent or nonvolatile read-only memory or in the form of a solid-state memory.

4. The system as recited in claim 2, further comprising at least one of a hardware and a software interface for data interchange and communication between the first data store, the access device, and the motor control unit.

5. The system as recited in claim 1, wherein the first block identifies a start of the function archive and the last block identifies an end of the function archive.

6. The system as recited in claim 1, wherein the information relevant to unpacking the function archive includes a type, a total length, a size, a version, a data rate, an origin, and an addressee.

7. The system as recited in claim 1, wherein the motor control unit has a basic component configured to unpack or install the at least one selected functional module during the transfer and to implement relevant functions in the motor control unit.

8. The system as recited in claim 1, further comprising a descriptor configured to use available descriptions of the plurality of functional modules to create a functional or technical description of firmware or store the functional or technical description on the first data store.

9. The system as recited in claim 8, wherein the functional or technical descriptions of the firmware are properties of individual blocks of the function archive.

10. The system as recited in claim 1, further comprising a checking device configured to check the plurality of functional modules or functions of the plurality of functional modules for dependencies or links and configured to use the ascertained dependencies or links to perform a plausibility check for completeness of the plurality of functional modules.

11. The system as recited in claim 10, wherein the checking device indicates when required functional modules from the plurality of functional modules are not selected based on the dependencies or links.

12. The system as recited in claim 10, wherein the checking device takes the dependencies or links as a basis for automatically selecting required functional modules from the plurality of functional modules.

13. A method for a demand-based functionalization of a motor control unit comprising:
- selecting, using an access device, at least one of a plurality of functional modules stored on a first data store, wherein the functional modules correspond to different functions available for use by the motor control unit during operation of a motor controlled by the motor control unit, and wherein the functions of the functional modules are displayed on an output device such that the at least one of the plurality of functional modules is selectable by a user based on a demand;
- creating a function archive using the at least one selected functional module, the at least one selected functional module being stored in at least one of packed and compressed form in the function archive, the function archive including a plurality of blocks arranged consecutively, wherein each block except a first and a last block includes data of a respective one of the at least one selected functional module and has a header, each of the headers including information relevant to unpacking the function archive and cyclic redundancy check fields for the respective header and the data of the respective one of the at least one selected functional module; and
- loading the function archive into a motor control unit, wherein the at least one selected functional module are implemented in the motor control unit so as to provide a flexible customization of the overall functionality of the motor control unit, wherein the loading the function archive includes loading corresponding firmware required for operation of the motor control unit and determining the overall functionality of the motor control unit and is performed using a configuration tool integrated into the access device.

14. The method as recited in claim 13, wherein the loading operation comprises transferring and unpacking of the functional module archive, the first block identifying a start of the function archive and the last block identifying an end of the function archive.

15. The method as recited in claim 13, further comprising loading, unpacking, installing and implementing the at least one selected functional module using a basic component of the motor control unit.

16. The method as recited in claim 13, wherein every functional module contained in the function archive implements a selected function of the motor control unit.

17. The method as recited in claim 13, wherein required functions or functionalities are selected in preparation using an interface during a configuration of the motor control unit.

18. A method for a demand-based functionalization of motor control units comprising:
- selecting at least two of a plurality of functional modules stored on a first data store based on demand, wherein the functional modules correspond to different functions available for use by the motor control unit during operation of a motor controlled by the motor control unit, and wherein the functions of the functional modules are displayed on an output device such that the at least one of the plurality of functional modules is selectable by a user based on a demand;
- creating a function archive in individual blocks using the selected functional modules and corresponding firmware, each of the selected functional modules being stored in a separate one of the individual blocks, the individual blocks including functional or technical descriptions of the firmware created using available descriptions of the plurality of functional modules, the selected functional modules being stored in at least one of packed and compressed form in the function archive, the function archive including a plurality of blocks arranged consecutively, wherein each block except a first and a last block includes data of a respective one of the selected functional modules and has a header, each of the headers including information relevant to unpacking the function archive and cyclic redundancy check fields for the respective header and the data of the respective one of the selected functional modules; and
- loading the function archive into a motor control unit, wherein the at least one selected functional modules and underlying functions are implemented in the motor control unit so as to provide a flexible customization of the overall functionality of the motor control unit, wherein the loading the function archive includes loading corresponding firmware required for operation of the motor control unit and determining the overall functionality of the motor control unit and is performed using a configuration tool integrated into the access device.

* * * * *